US006233428B1

(12) United States Patent
Fryer (10) Patent No.: US 6,233,428 B1
(45) Date of Patent: *May 15, 2001

(54) SYSTEM AND METHOD FOR DISTRIBUTION OF CHILD CARE TRAINING MATERIALS AND REMOTE MONITORING OF CHILD CARE CENTERS

(76) Inventor: Bruce Fryer, 600 Prospect St., Maplewood, NJ (US) 07040

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,941

(22) Filed: Sep. 17, 1997

(51) Int. Cl.[7] ................................................ G09B 5/00
(52) U.S. Cl. ........................................... 434/308; 434/324
(58) Field of Search ..................................... 434/308, 324

(56) References Cited

U.S. PATENT DOCUMENTS

| | | | |
|---|---|---|---|
| 5,318,450 | * 6/1994 | Carver | 434/336 |
| 5,408,330 | * 4/1995 | Squicciarini et al. | 386/107 |
| 5,441,047 | 8/1995 | David et al. | |
| 5,491,508 | * 2/1996 | Friedell et al. | 348/16 |
| 5,517,236 | * 5/1996 | Sergeant et al. | 348/143 |
| 5,534,914 | * 7/1996 | Flohr et al. | 348/15 |
| 5,583,561 | 12/1996 | Baker et al. | |
| 5,594,491 | 1/1997 | Hodge et al. | |
| 5,677,979 | * 10/1997 | Squicciarini et al. | 386/46 |
| 5,689,442 | * 11/1997 | Swanson et al. | 380/9 |
| 5,737,011 | * 4/1998 | Lukacs | 348/15 |
| 5,745,161 | * 4/1998 | Ito | 348/15 |
| 5,767,897 | * 6/1998 | Howell | 348/15 |
| 5,768,537 | * 6/1998 | Butter et al. | 709/247 |

(List continued on next page.)

OTHER PUBLICATIONS

Bigness, "Keeping Watch, System Lets Parents Monitor Children In Day–Care Center," Chicago Tribune, Sep. 2, 1997.

Various Pages, http://www.kidcam.com/, downloaded Dec. 3, 1997.

Galaxy–NET Telecom, "Streaming Audio/Video," http://www.galaxy–net.com/streaming.html, downloaded May 15, 1997.

Various Pages, http://home.wwa.com/ and http://www.w-wa.com/, downloaded Dec. 3, 1997.

Hilzenrath, "Day Care on Camera! Gets Test in Georgia," The Washington Post, Apr. 4, 1997.

Vosaic, "Software & Support," http://choices.cs.uiuc.edu/srg/stan/upload/html/so ftware.html downloaded May 15, 1997.

(List continued on next page.)

Primary Examiner—Valencia Martin-Wallace
Assistant Examiner—Chanda Harris
(74) Attorney, Agent, or Firm—Bacon & Thomas, PLLC (57) ABSTRACT

A child care monitoring network integrates a centralized information dissemination system with live streaming video to increase parental involvement with child care workers and improve child care worker training, including provision for enabling parents to monitor their children during the workday over the Internet and for providing live training demonstrations during off-hours. A local area network connects video cameras to a multi-media computer for digitizing and compressing the video feed and supplying it to a regional broadcast server capable of delivering multiple broadcast video streams to parent subscribers either through direct Internet connections, or over a secured network connected to the Internet via a firewall. A pre-recorded video library and server may be provided in addition to the live video broadcast server for providing information and instruction to both parents seeking child care and to child care providers.

24 Claims, 6 Drawing Sheets

U.S. PATENT DOCUMENTS

| | | | | |
|---|---|---|---|---|
| 5,786,746 | * | 7/1998 | Lombardo et al. | 340/286.07 |
| 5,812,786 | * | 9/1998 | Seazholtz et al. | 709/233 |
| 5,833,468 | * | 11/1998 | Guy et al. | 434/350 |
| 5,844,600 | * | 12/1998 | Kerr | 348/17 |
| 5,850,250 | * | 12/1998 | Konopka et al. | 348/15 |
| 5,861,883 | * | 1/1999 | Cuomo et al. | 345/326 |
| 5,862,329 | * | 1/1999 | Aras et al. | 709/204 |
| 5,867,653 | * | 2/1999 | Aras et al. | 709/204 |
| 5,872,922 | * | 2/1999 | Hogan et al. | 709/204 |
| 5,872,923 | * | 2/1999 | Schwartz et al. | 709/205 |
| 5,884,284 | * | 3/1999 | Peter et al. | 705/30 |
| 5,896,128 | * | 4/1999 | Boyer | 345/327 |
| 5,914,747 | * | 6/1999 | Hamilton | 348/15 |
| 5,958,016 | * | 9/1999 | Chang et al. | 709/229 |

OTHER PUBLICATIONS

Parent Net, Inc., "Peace of Mind for Parents," http://www.kindercam.com, downloaded Apr. 30, 1997.

Thomas, "On the Cutting Edge of Remote Surveillance," http://www.pimall.com/nais/n.rem.sur.html downloaded Apr. 30, 1997.

Online Video Communications, "Watch Me!," http://www.ovci.com/watch-me/index.htm, downloaded Apr. 30, 1997.

Axis Communications "Press Release: parentnet," Apr. 3, 1997, http://www.axis.se/press/us/parentnet.htm, downloaded Apr. 30, 1997.

AVIS, http://www.towin.com/AVISE_Pl.html, downloaded Apr. 30, 1997.

Hamilton, "Peek-A-Boo, I See You," ZDNet, Apr. 4, 1997, http://www5.zdnet.com/anchordesk/story/story_812.html, downloaded Apr. 30, 1997.

* cited by examiner

SYSTEM AND METHOD FOR DISTRIBUTION OF CHILD CARE TRAINING MATERIALS AND REMOTE MONITORING OF CHILD CARE CENTERS

BACKGROUND OF THE INVENTION

1. Field of the Invention

This invention relates to a system and method for increasing access to child care training materials and services, including demonstrations and lectures, by child care service providers and parents, as part of an integrated child care network which also provides for increased parental involvement with child care personnel, including the ability of parents to observe classroom activities in real-time during the workday.

The invention also relates to a system made up of either a local area network (LAN) or a closed circuit television network (CCTV) that connects video cameras situated in child care classrooms with a multi-media computer for digitizing and compressing the video feed and supplying it to a regional broadcast server capable of delivering multiple broadcast video streams on a live or delayed basis to subscribers, either through direct Internet connections or over a secured network connected to the Internet via a firewall, for use in increasing interaction between child care providers and parents, and in providing educational and training services to subscribers of the network.

In addition, the invention relates to a method of distributing child care related information and training materials, for enabling parent subscribers to monitor their children from any Internet connection, and to a method of limiting unauthorized access to such a child care monitoring system.

2. Discussion of Related Art

While child care is a central concern in the lives of millions of parents, most parents have little knowledge of what goes on at a child care center, and no way of gathering information despite the numerous sources available. Lack of communication between child care workers and parents increases anxiety on the part of the parents, which in turn affects the morale of the workers, and possibly the quality of care received by children at the centers. Most child care centers cannot afford a comprehensive training program, and continuing education provided by state agencies reaches very few workers. When an incident occurs at a center, it is often impossible to verify child care worker's explanations, which can lead to such problems as legal difficulties for the center and workers, a loss of confidence on the part of parents, and a decrease in the number of qualified persons willing to enter the child care field.

The present invention seeks to address these and other problems, using currently available technology combined in a unique manner, by providing an integrated network which can provide information to the public and training materials to child care workers while increasing interaction between parents and the children's caregivers, and which can provide a record of activities that can be used to increase the confidence of parents and prevent misunderstandings.

In order to achieve its objectives, the system and method of the invention makes use of a technology known as streaming video, in which a single video feed from a camera is compressed and split into multiple streams for delivery over the Internet, on demand and in real time, to computers with access to an Internet Service Provider (ISP). By using streaming video technology, the system and method of the invention enables live monitoring of child care centers, including audio, and also recording of activities for playback during quiet times and, upon further compression, for archiving purposes. The use of streaming video in an integrated network of the type described in detail below also allows live demonstrations for use in training and accreditation programs, and in addition can serve as a medium for dissemination of pre-recorded training and information materials.

Even though individual elements of the technology used in the system and method of the invention are known, the combination of elements and results obtained by the system and method of the invention have not previously been achieved. There have been prior attempts to set-up child care center monitoring systems, but each has clear disadvantages relative to the present system and method, as explained below.

The real-time monitoring aspect of the present invention is related to the field of remote surveillance systems, which involves linking of multiple video cameras located at different sites to a central monitoring station, but there is a fundamental difference between such remote surveillance systems and the type of monitoring with which the present invention is concerned. This difference relates to the fact that conventional remote video surveillance systems are intended for security purposes, such as for use by a security service in monitoring a bank, convenience store, or parking facility, or for monitoring by a healthcare provider of the elderly and those with particular medical needs (an example of the latter type of surveillance system is found in U.S. Pat. No. 5,441,047, issued Aug. 15, 1995), and therefore generally are free to use dedicated communications lines between the facility being monitored and the central station. While the communications lines can be in the form of an RF, cellular, or satellite link, or even by modem over a telephone line as described in the afore-mentioned U.S. Pat. No. 5,441,047, none of these systems provides for subscriber access, nor is it in general desirable to provide subscriber access in surveillance systems of this type.

The type of monitoring with which the present invention is concerned, in contrast, involves a monitoring entity which is not located at a central station, but rather to portions of the general public, including parents who have children in a daycare center and child care workers seeking continuing education. In that case, while security is still desirable, access cannot be limited to a central station, but rather must be provided to subscribers at their workplaces or homes.

The need for such child care center monitoring systems has not gone unnoticed, but implementations to date, while attracting significantly publicity, have been unsatisfactory for a number of reasons. At least three such child care center monitoring systems have recently been publicized, with all three having significant disadvantages relative to the system and method of the invention.

The first of these systems is the Simplex Knowledge Company's I See You! service, which was launched as a turnkey hardware and software system complete with computer, proprietary software, color camera, digitizer, modem, and marketing package. The supplied camera takes a snap shot picture every sixty seconds and continually refreshes the on-screen image with a new photograph, which is digitized and uploaded to an Internet server for access on a subscriber basis by the public. A demonstration of this system can be found on the World Wide Web at http:\\www.skc.com.

The second of these systems is ParentNet, Inc.'s Kinder-Cam service. The KinderCam service uses an Axis Neteye 200 digital still picture camera to take snapshots of a child's daycare classroom for uploading to a server and transfer over the Internet to the parent's desktop. A demonstration of this system can currently be found on the World Wide Web at http:\\www.kindercam.com, while a description of the Axis Neteye 200 cameral may be found at http:\\www.axisinc.com.

The third of the three systems currently being publicized is Online Video Communications, Inc.'s Watch Me! service which provides a website and equipment for uploading snap-shots of classrooms at participating child care centers to the website for access by subscriber parents. A demonstration and schematic of the system can be found on the World Wide Web at http:\\www.ovci.com.

One of the principal differences between the Simplex, ParentNet, and Online Video Communications systems and the present invention, at least with respect to monitoring of centers, is that these systems utilize digitized still pictures rather than live streaming video. The effect of viewing the demonstrations of these systems is similar to watching a slide show, in which images are changed at a rate of about two per minute, and thus a only limited sense of action is provided.

The main problem with such slide show arrangements is that the "slides" or still images are taken without regard to image content, and the slides are unaccompanied by narration, which has a disorienting effect on the viewer. For example, in one frame the hand of a person might be seen entering the image and in the next frame the foot of the person is depicted as disappearing from the opposite side of the image, or in one frame a child might appear to be playing, and the next frame the child might be crying, with no clue as to what has occurred during the interval between images. Aside from being disconcerting to the viewer, the succession of still images without audio is generally unable to capture the nuances of an activity or the actions of individuals in a field of view. Even at a rate of two image changes per minute, downloaded at 28.8 Kbps, the wait for new images in this type of system can seem interminable. In addition, due to the intermittent nature of the image capture techniques used by these systems, they are virtually useless for training purposes, or as a record of activities for use by accreditation, insurance, and legal authorities.

In contrast, the use by the present invention of live streaming video, including audio, for remote monitoring purposes allows more effective training demonstrations, permits parents to see their children actually participating in activities, and provides a record of activities which can be used for evidentiary and investigative purposes.

In addition to the problems resulting from the slide show format, a problem which is barely addressed by most of the current systems is prevention of unauthorized access to the transmissions. Security, if provided at all, is generally in the form of a standard user identification number and password arrangement, which has the disadvantage that, while the password may be changed as often as two times per month, those who present a risk to children, such as ex-spouses, are often known to the custodial parent and may have, or have recently have had, access to the password, and thus can easily obtain access to the system. The present invention avoids this problem by requiring that subscribers register for digital certificates. These certificates, which will reside on the user's computer's hard drive, will be used to authenticate the parent's identity. In a transaction that is not visible to the parent and which validates his or her current subscriber status (by entering the username and password, which is compared to a database of current subscribers), the invention's secure electronic transaction (SET) server requests an encrypted copy of the user's digital certificate. If this certificate matches with the username, the service connection is authorized. If not, the connection is cancelled.

The training aspect of the present system and method, which allows child care centers to utilize their equipment during non-operating hours for provider education and accreditation training, as well as individual provider peer review and coaching, or to provide a complete program of information and training for both parents and providers, including the availability of institutional videos and live demonstrations, does not appear to have been addressed by the currently available systems noted above. While training programs are available, most are centered at universities and inaccessible to the majority of childcare providers, particularly those involving live demonstrations. Accreditation officials have expressed a desire for a way to improve access to training and provide for continuing education programs, but at present such training is limited to individual classes which, for reasons of time and distance, are inaccessible to the majority of providers.

SUMMARY OF THE INVENTION

It is a first objective of the invention to provide an integrated childcare network that provides improved access to training, system wide training or mentoring programs, and live demonstrations, as well as a convenient way for parents to become more involved with their child care providers, including the ability to monitor their child's classrooms on a live or delayed basis.

It is a second objective of the invention to provide a remote video monitoring system capable of providing live video and audio broadcasts from child care centers to parents at their workplaces, and for use in a system-wide training and education for childcare providers.

It is a third objective of the invention to provide a remote video monitoring system that allows parent subscribers to monitor their children, and child care workers to view live demonstrations, from any computer with an Internet connection, by providing live video and audio broadcasts from child care centers over the Internet.

It is a fourth objective of the invention to provide an integrated child care network which provides live video and audio broadcasts from child care centers to subscriber parents via the Internet, and which also provides child care education services to both providers and parents.

It is a fifth objective of the invention is to provide an integrated child care network which provides live video and audio broadcasts from a child care center over the Internet, but which includes security features which ensure that access to the broadcasts is limited to custodial parents with actual physical access to the child care center or school on the day of access to the system.

These objectives are achieved, in accordance with the principles of a preferred embodiment of the invention, by providing a wire LAN or CCTV network that connects video cameras to a multi-media computer for digitizing and compressing the video feed and supplying it to a regional broadcast server capable of delivering multiple broadcast video streams to parent subscribers either through direct Internet connections, or over a secured network connected to the Internet via a firewall and SET server.

These objectives are further achieved by providing a method of enabling parents to view their children during the workday at child care centers and schools, and for enabling childcare providers to view live training demonstrations and live or recorded training materials, by positioning a video camera at a location at which video of the child can be captured, capturing the video of the child and generating a video stream, supplying the video stream to a regional broadcast server remote from the child care center, optionally recording the video stream for later playback or use in training sessions, splitting the live or recorded video stream into multiple video streams, supplying the multiple video streams to a plurality of subscribers, and displaying a real-time live video image of the child on a subscribers computer.

The invention thus provides a system which enables parent subscribers to monitor their children from any computer with an Internet connection, and also a scalable training network that can provide a variety of information to both subscribers and child care providers originating either from a central video server located at the regional office for pay-per-view on request, or at a training facility for live training sessions using the same type of video camera and server setup found in each participating child care center.

In accordance with an especially preferred embodiment of the invention, a pre-recorded video library and server are provided in addition to the live video broadcast server for providing information and instruction to both parents seeking child care and to child care providers.

In addition, the objectives of the invention are achieved by providing an improved security method according to which access to live broadcasts can be obtained only verification of the parent's subscriber status and identity.

The invention thus provides a secure visual bridge between parents and their children's child care center or pre-school classroom, serving as a powerful tool in helping the parents balance work and family responsibilities by giving them the ability to connect with their children and child care providers during the workday, while also serving as a medium to ensure widespread dissemination of training and educations materials and programs which can be viewed by child care workers at convenient times and locations.

The system and method of the invention has benefits far beyond the immediate benefit of allowing parents to participate in the education of their children. The small cost in time spent viewing their children is more than made up for by allowing parent/employees to be more relaxed and focused on their work responsibilities in the assurance that the child has made a smooth transition from home to the center and is receiving quality care, and thus it is anticipated that the system will be of interest not only to individual subscribers, but also to corporations and other employers as a whole, and thus the videos provided by the system of the invention are arranged to be distributed and administered by corporate or agency LAN servers as well as by direct connection.

While the invention is described in connection with children and parents, it will be appreciated that subscribers with a legitimate interest in viewing the activities at a daycare center or school could include relatives other than parents, as well as licensing authorities and school administrators. The ability of the video streams to be recorded for later playback permits the assembly of archives which can be used for insurance purposes or by legal authorities.

DETAILED DESCRIPTION OF THE PREFERRED EMBODIMENTS

Figure 1:
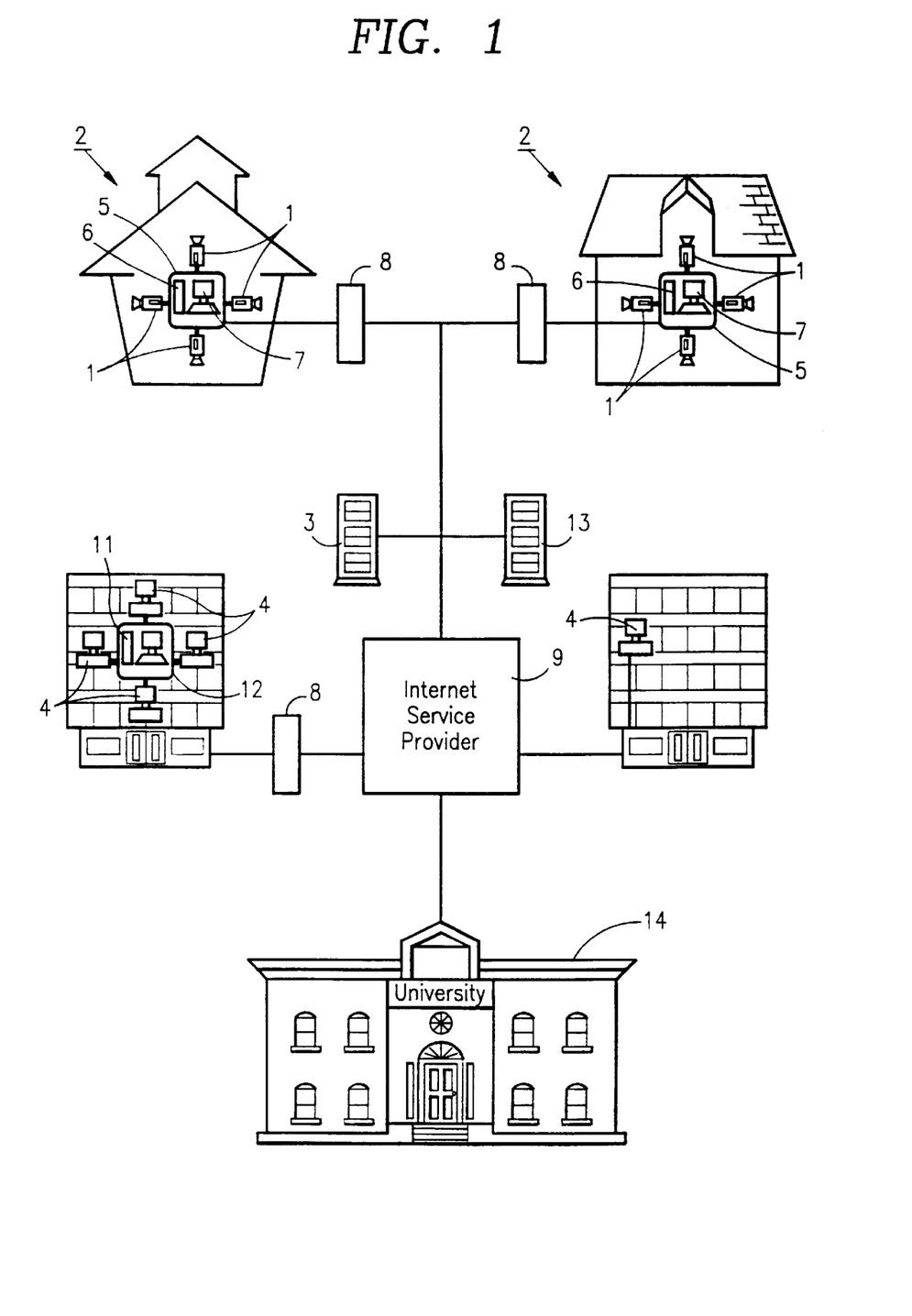
FIG. 1 is a schematic diagram of a child care network constructed in accordance with the principles of the preferred embodiment of the invention.

As illustrated in FIG. 1, the system of the preferred embodiment of the invention includes, in its broadest form, at least one video camera 1, such as a CCD video camera, installed in at least one classroom of a daycare center, pre-school, or other supplier of childcare services 2 (hereinafter referred to as a child care center) and which is capable of supplying live video feeds from the camera to an open or public network, a regional broadcast server 3, and a plurality of client or subscriber computers 4 situated at locations remote from the child care center, school, or pre-school and capable of receiving and displaying the live video feed.

More specifically, each of the video cameras 1 is connected via a local area network 5, such as an Ethernet LAN capable of 10 Mbps or a coaxial CCTV network to a multi-media computer located in the child care facility. Computer 6 includes a video capture card, an network interface card, and firewall software for preventing unauthorized access to the local area network. Connected to each of the computers 6 is a presentation monitor 7 and a router (not shown) for supplying video streams under control of the firewall software (depicted symbolically by element 8) to broadcast server 3.

Broadcast server 3 is located at a regional office of or ISP office capable of serving a number of centers, and is connected to the routers by a broad bandwidth lease line, serving to split the video stream from a camera in the classroom into multiple video streams depending on demand from subscriber computers. The number of streams produced by broadcast server 3 will equal the number of subscriber computers online, conserving the amount of bandwidth that is required for each child care center connection. The broadcast server 3 is connected to a local Internet Service Provider (ISP) 9 over another lease line.

The video stream generated by a camera may, in addition to being supplied directly to broadcast server 3, be recorded for delayed broadcast during periods of inactivity at the center or private-time for center workers, or as part of a menu of viewing options for the parent, who may be given the option of viewing a live activity or replaying an earlier activity.

Furthermore, recorded live sessions can be time stamped, compressed and archived for later retrieval by legal authorities, insurance adjusters, and others as the need arises. This is made feasible by currently achievable compression ratios of 500 to 1 or greater, and can be carried out either at the center level, or at the site of the broadcast server or network regional or system-wide administrator.

The broadcast server also serves as the SET server, although this server can also be reside on its own. The SET server validates the identity of the parent before the requested broadcast services is authorized.

The subscriber access side of the preferred system includes links between Internet Service Provider 9 and the individual subscriber computers 4 via their own Internet Service Providers. Corporations and other employers may also install their own broadcast server 11 for splitting a single video stream into multiple streams to be distributed over an internal network 12, allowing the employer to monitor usage and conserve its Internet bandwidth consumption by allowing more than one employee to view a classroom based on a single incoming video stream that can be split once inside of the corporate firewall and then sent to multiple computers over the corporate LAN 12, either on an individual subscription basis or as an employee benefit charged to the employer.

The network configuration shown in FIG. 1 may also be used to provide education and training services for the public and for the child care center industry. For a center to participate, the center simply needs to attach a television or large screen computer monitor to one of their LAN nodes or directly to the multi-media computer. The source of the training materials can originate from either a central video server 13 located at the regional office for pay-per-view on request or at a training facility 14 for live training sessions using the same type of video camera and server setup found in each child care center.

For individual training sessions, the user dials into the video server 13 and makes a selection from a database of available prerecorded videos. For live events, broadcast to multiple centers, the regional office's video broadcast server 3 will split a single live stream into multiple streams and route each one to a participating center. In addition, arrangements can be made for viewing by students during the workday, as part of a "mentoring" program in which inexperienced workers can view more experienced workers under actual conditions for extended periods, with permission of parents of the children being viewed.

It will be appreciated by those skilled in the art that the individual elements of the preferred child care network illustrated in FIG. 1 are each by themselves conventional elements. The technology is similar to that used for video conferencing over the Internet, but is adapted for use as described above in allowing parent subscribers to monitor their children during the workday. Unlike video conferencing, simultaneous interaction is not required in the present system. Nevertheless, the video cameras, digitization and compression equipment, video broadcast and pre-recorded video servers, and firewall technology described below are all commercially available from vendors such as VDO, Vosaic, White Pine, Zing, and Galaxy-NET Telecom.

On the other hand, the preferred system will benefit from improved bandwidth as network capabilities expand, and thus should not be limited to existing technology. For example, the preferred network will be adaptable to new technologies such as the Iridium satellite network. The concept of using the "Internet" or "World Wide Web" should therefore be considered to encompass any two-way public network, and associated hardware and software, capable of carrying digital transmissions of sufficient bandwidth. Nevertheless, the following description of "displays" for the preferred system is based on conventional web page technology which uses widely available browser software to receive streaming video feeds at the subscriber computer, and in addition has the capability of displaying static images written in hypertext markup language and supplied by the regional broadcast server 3 along with the video feed.

Administration of the system shown in FIG. 1, including billing and subscriber services, as well as maintenance of archives and pre-recorded tape libraries, may be carried out at regional broadcast centers or a super-regional or nation-wide administration centers.

Figure 2:
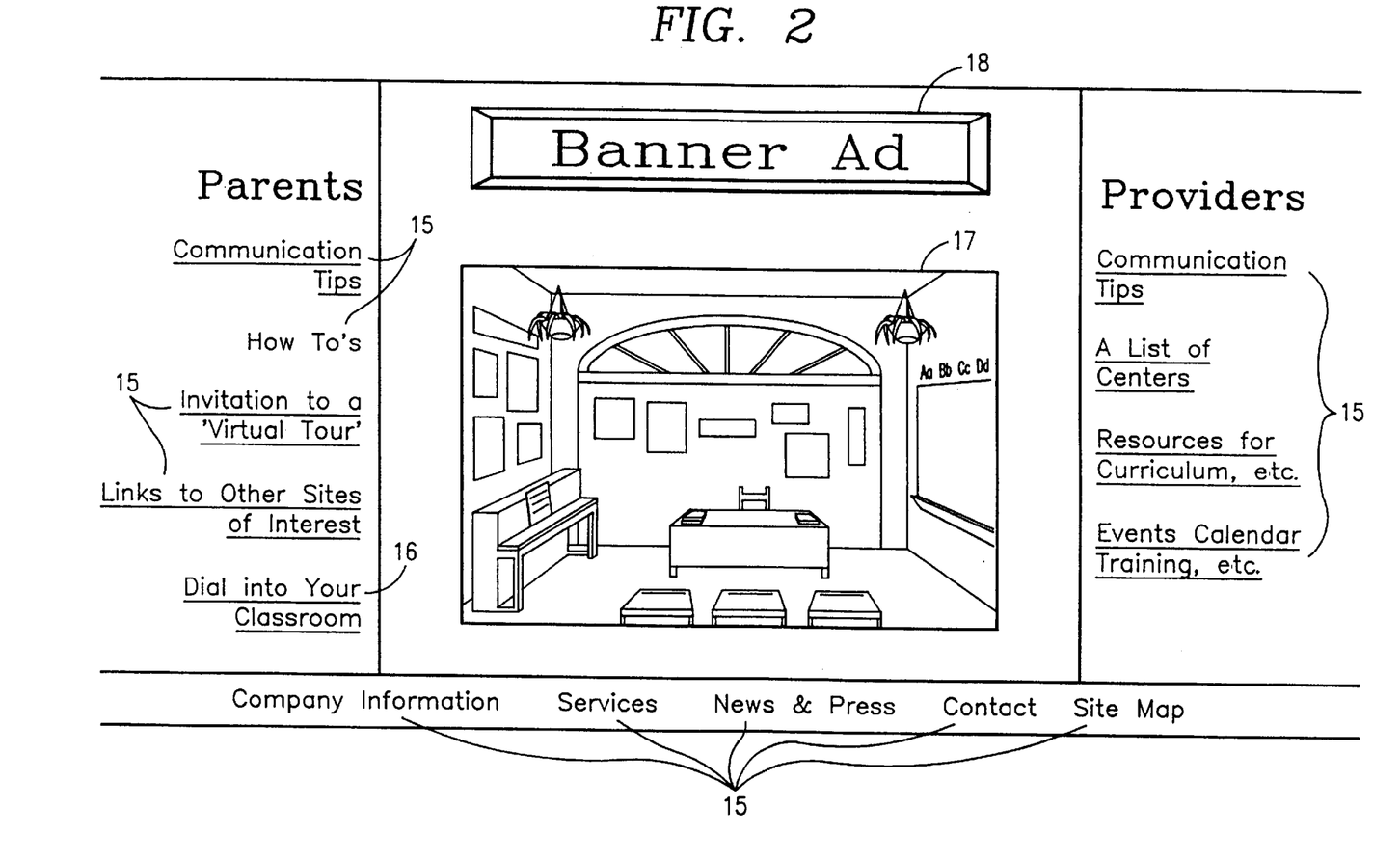
FIGS. 2–4 show various displays illustrated features of the preferred network.

FIG. 2 shows a subscriber display screen incorporating a video feed supplied by the network illustrated in FIG. 1. The display screen contains links 15 to informational web pages for both parents and providers including, for example, pages developed by the network administrator that offer tips on how to effectively communicate with one another, information on a particular center, general information provided by the network administration or by another child care information provider such as the National Association for the Education of Young Children, Youth and Families Site, and information on accessing live and pre-recorded training sessions, as well as a link 16 to the sign-in screen for accessing a video feed from the child's classroom. This display may also contain a video feed 17 containing a welcome message or other information of general interest, and banner advertisements 18 and sponsor notes of potential interest to the subscriber.

Figure 5:
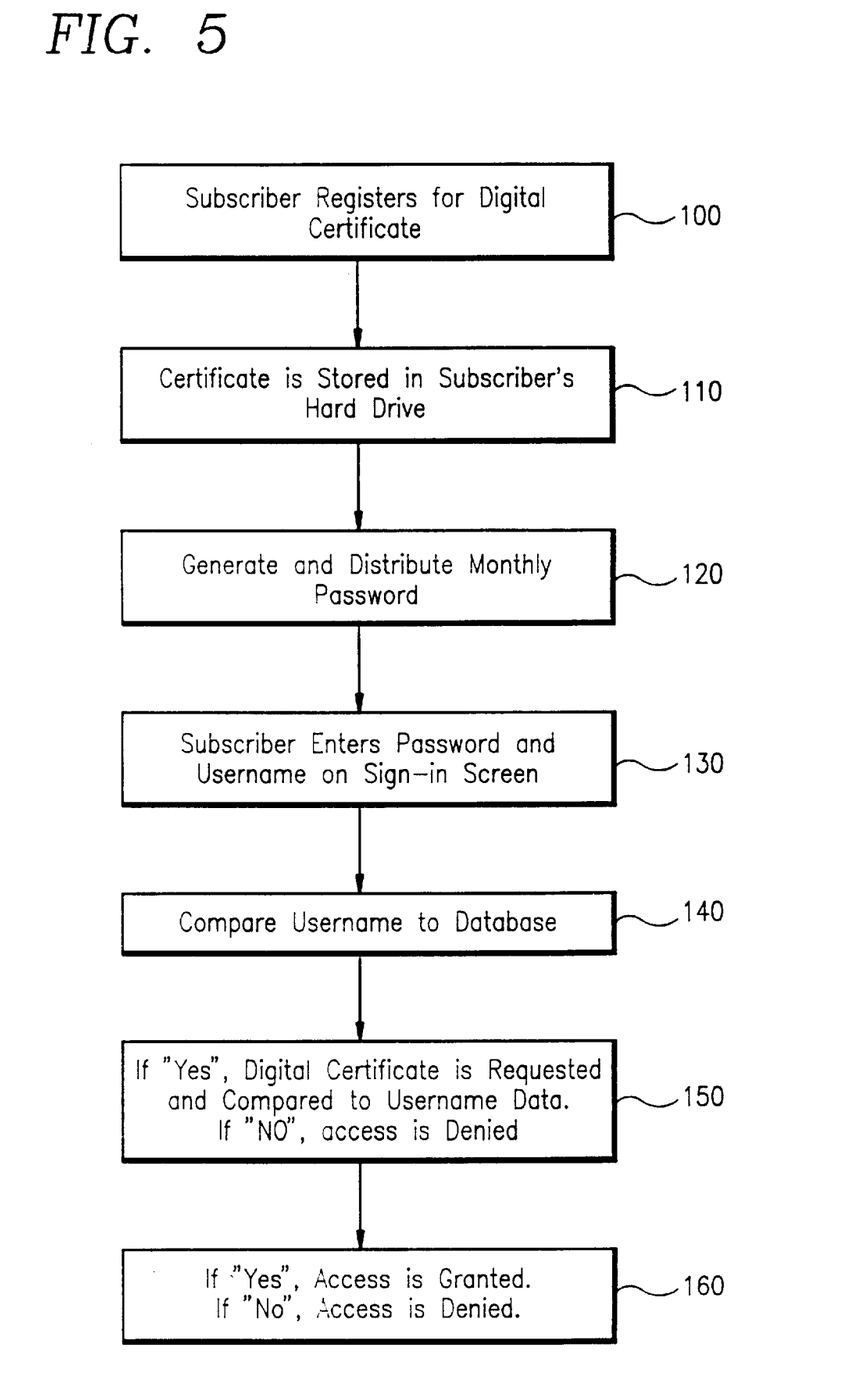
FIG. 5 is a flowchart illustrating a method of preventing unauthorized access to live video broadcasts for use in connection with the system illustrated in FIG. 1.

Access to the display of the child's classroom is through a sign-in screen (not shown) in conjunction with digital certification which limits access to current subscribers according to the method depicted in FIG. 5. New subscribers must register for a digital certificate with the network's chosen certificate authority before their subscription begins (step 100). This digital identification data is stored on the subscriber's computer's hard disk drive or other suitable storage media (step 110). In addition, a unique password is provided to all paid subscribers on a monthly basis (step 120). The subscriber enters this password on the sign-in screen along with a subscriber chosen username (step 130). This information is then compared to a subscriber database in order to confirm the subscriber's current status (step 140) and, if the username is confirmed, the network's authentication server requests through the subscriber's Web browser that it identify itself by sending an encrypted copy of the subscriber's digital certificate (step 150). This certificate is decoded and matched to the username data and access is given only if a match is found (step 160). Additional security could also be provided by current access limiting technology, including use of smartcard-based digital signature authentication schemes or, in a corporate environment, access to the system could be limited to designated computers.

Figure 3:
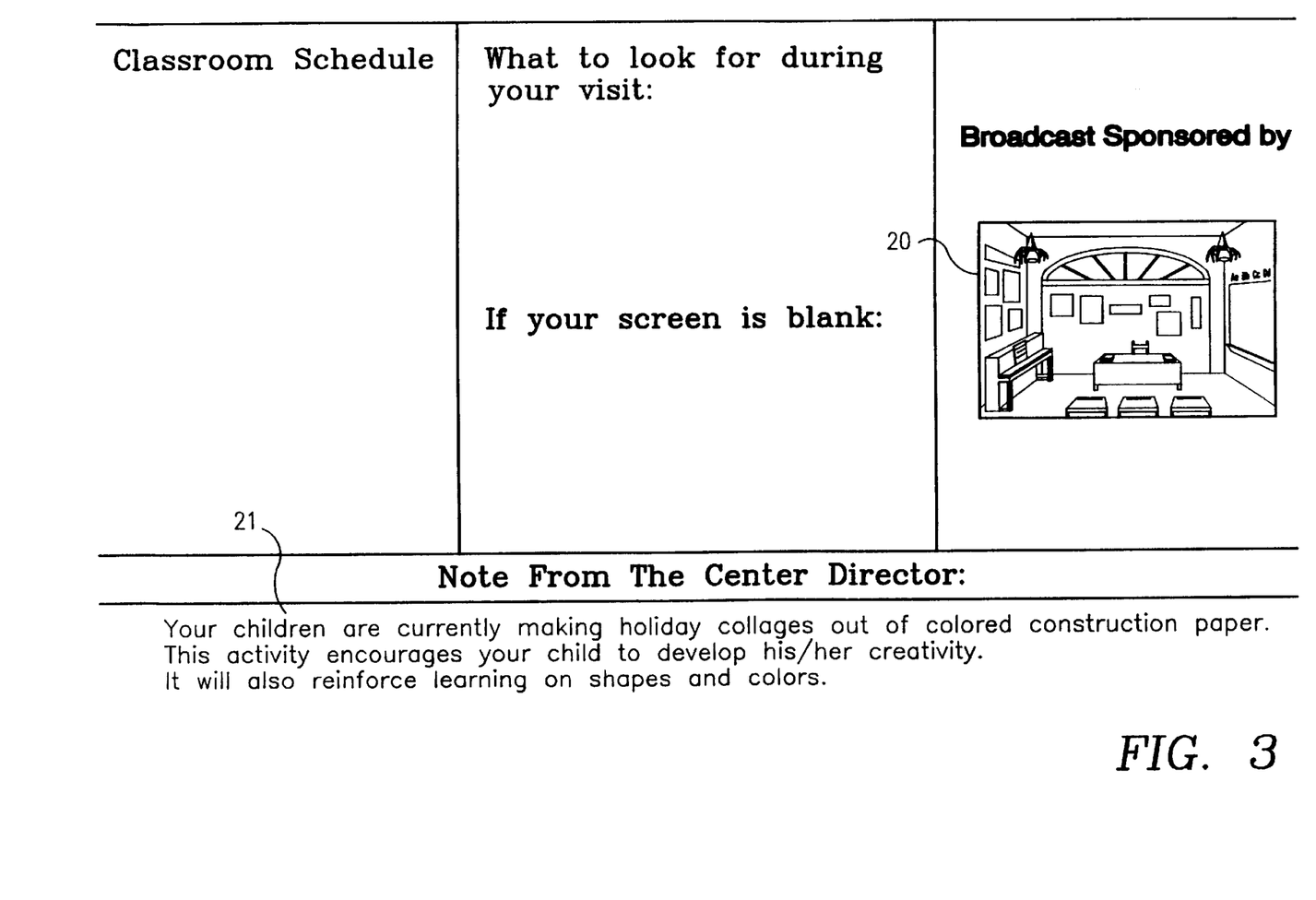

Once the access to the system has been gained, as shown in FIG. 3, a customized page for the selected center or classroom will be displayed, which may include, in addition to the live broadcast display 20, messages 21 entered by the teacher or center administrator via the multi-media computer 6 in each center. The administrators of the preferred network will gather a database of center curricula in order to provide "parent notes" on screen while subscriber's view their child's activities, the notes explaining what the children are doing and which developmental skills are being taught. For example, the on-screen "parent notes" displayed while a classroom of toddlers is working on a holiday decoration project could explain that the activity is helping the children learn basic shapes and colors.

A center's broadcast could also include multiple levels of displays, with an introductory page containing center announcements, upcoming events, and other news preceding the page which displays the video feed page, rather than being displayed simultaneously, and the video feed portion of the page may also occupy a full-screen display. Advantageously, provision for more personalized messages either from the parent or from the center could be made by including e-mail capabilities.

Figure 4:
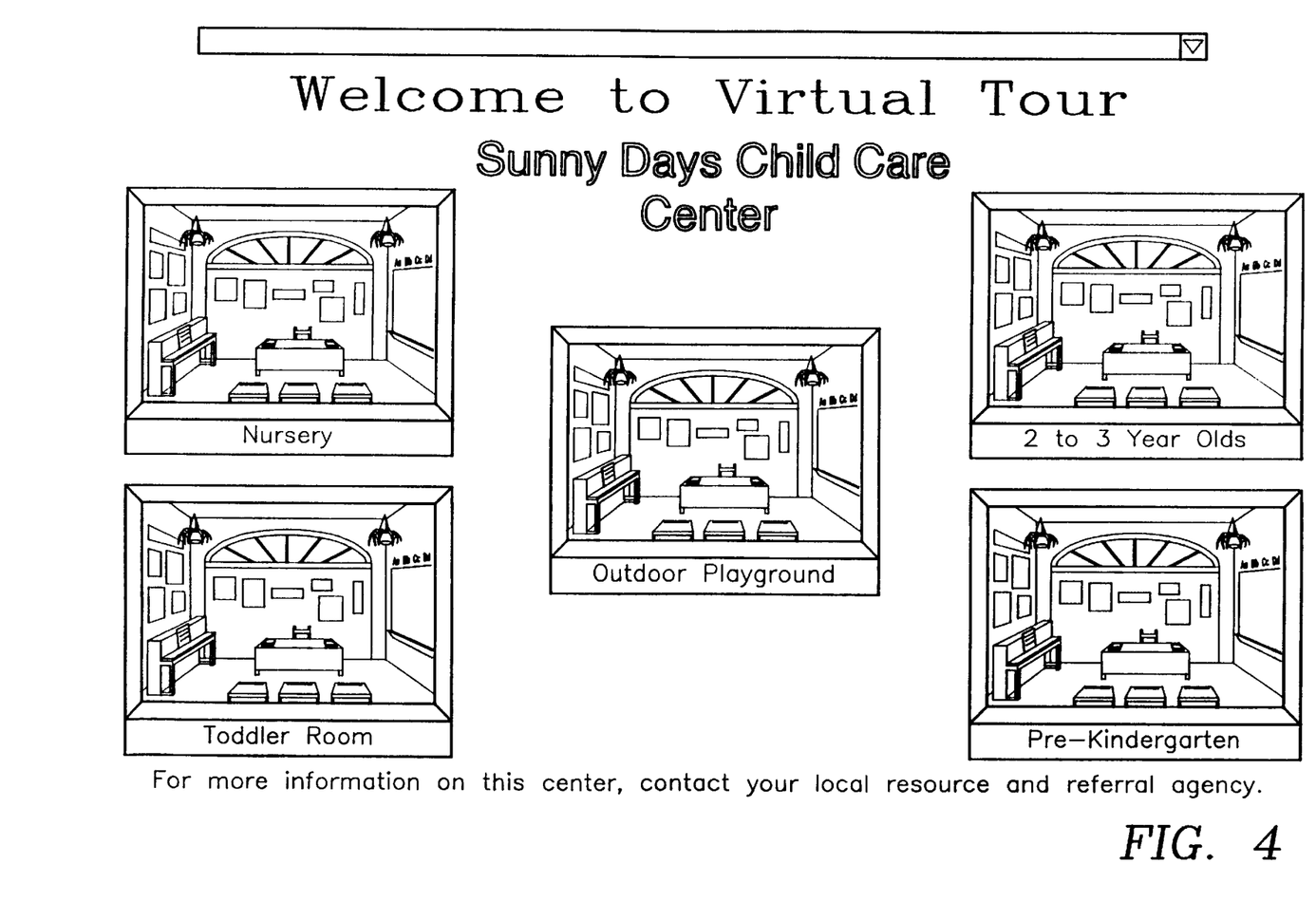

In addition, as shown in FIG. 4, displays accessible either by a general password or on an unrestricted basis could be made available to site visitors to provide a digital photo album of the center, allowing prospective customers to take a virtual tour of the facility such as is shown in FIG. 2, either via the regional server or through the servers of state and national resource and referral agencies offering listings of local child care providers, in connection with information regarding a center's size, accreditation, price and the availability of space.

Figure 6:
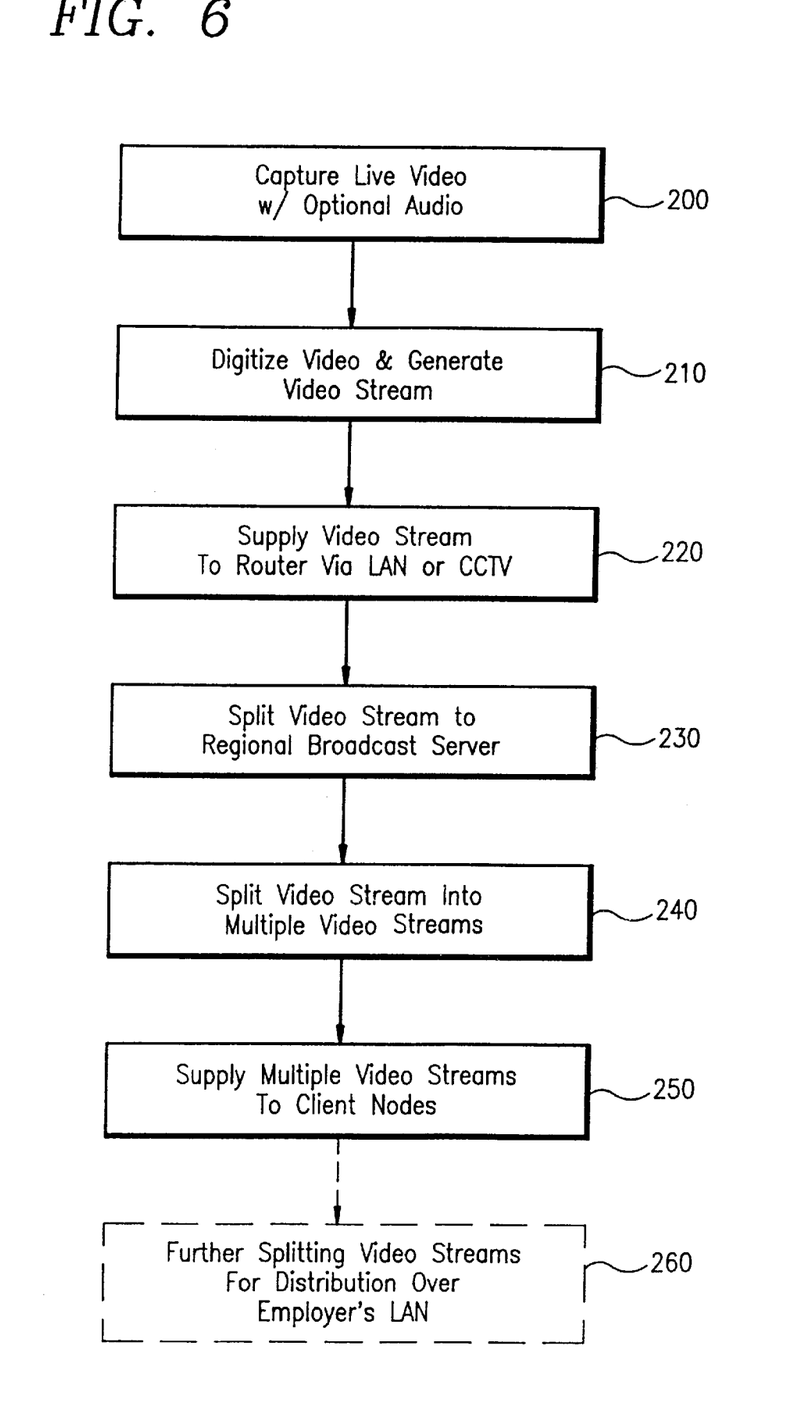
FIG. 6 is a flowchart illustrating an overall method of utilizing the system illustrated in FIG. 1

The overall method of implementing the system is illustrated in FIG. 6. It includes the steps of capturing live video and, optionally, sound using video cameras located in classrooms of a child care center or school (step 200), digitizing the video (step 210), supplying the video over a local area network to a multi-media computer and router (step 220), supplying the video feed to a regional broadcast server (step 230), splitting the video feed into multiple video streams (step 240), and supplying the multiple video streams to subscribers either on a live or delayed basis through modem connections to the Internet or via a firewall to a corporate broadcast server (step 250), the step of supplying the video streams to an employer's broadcast server including the optional step (step 260) of further splitting a video stream for individual subscribers on the employer's internal network.

As indicated above, the method also can be used to supply live training broadcasts to centers from educational facilities equipped in the same manner as the child care centers, and as part of the step of supplying the video streams to subscribers, includes the steps of broadcasting display pages including information of general and specific interest to parents and child care providers, notes from a particular center or classroom, e-mail of personal messages, and display of banner advertisements.

The invention thus provides both a system and method of enabling subscribers to monitor children at participating child care centers by means of live video feeds from any properly equipped client computer, upon entry of a daily password, and also an integrated child care network with information dissemination in addition to monitoring capabilities. As a result, the system and method of the invention addresses a widespread societal problem, offering the potential to both increase the confidence of parents in their children's child care providers and at the same time increase the morale of child care workings through improved training, and increased interaction with and understanding of parents.

Having thus described various preferred embodiments of the invention, those skilled in the art will appreciate that variations and modifications of the preferred embodiment may be made without departing from the scope of the invention.

For example, regional servers could be supplemented by connections to databases or servers connected to more than one regional server, and the system could be adapted to provide video streams in different formats, if necessary. On a local level, wire LAN 5 and computer 6 could be replaced, respectively, by wireless networks with network controllers capable of splitting a feed to distribute video streams as needed within a facility while saving bandwidth, or by local area networks shared by separate child care facilities.

Furthermore, while the invention is especially adapted to utilizing the technique known as streaming video, in which the video is displayed as it is being downloaded, the invention is intended to encompass any live action video broadcasting techniques, including transfer of video in packets using the technique known as pseudo-streaming video, and may be adapted for use with two-way interactive cable networks as well as Internet-type computer networks.

Finally, in addition to the live video and prerecorded video broadcast servers, the system of the preferred embodiment could include a software library, or at the ability to provide client software having security features and video reception capabilities for different types of subscriber computers, with the ability to update the software. All such variations and modifications are intended to be included within the scope of the invention.

Accordingly, those skilled in the art will appreciate that the invention is not intended to be limited by the above description or accompanying drawings, but rather is intended to be defined solely in accordance with the appended claims.

I claim:

1. A system for increasing access to child care training materials and services, including demonstrations and lectures, by child care service providers and parents, as part of an integrated child care network which also provides for increased parental involvement with child care personnel, including the ability of parents to observe classroom activities in real-time during the workday, comprising:

at least one video camera located in a child care facility and capable of generating a live video feed;

means for supplying said live video feed from said child care facility to a regional broadcast server, said regional broadcast server including means for splitting the live video feed into a plurality of live video feeds for transfer over the Internet to subscriber client nodes, a number of said live video feeds equaling a number of client nodes authorized to receive said live video feeds; and means connected to said client nodes for displaying one of said live video feeds upon authorization to receive said one of said live video feeds, wherein said means connected to said client nodes for displaying one of said live video feeds includes web browser software capable of receiving streaming video feeds, and of enabling said parents to communicate directly over the Internet with personnel at said child care center from any location with Internet access, and wherein said regional broadcast server further includes means for connecting said client nodes to a server arranged to provide child care information to said subscribers and to said child care facility on demand.

2. An apparatus as claimed in claim 1, wherein said video cameras are CCD video cameras.

3. An apparatus as claimed in claim 1, wherein said video camera is connected to said means for generating said video stream by connection means selected from the group consisting of a local area network or a closed circuit television network.

4. An apparatus as claimed in claim 1, wherein said means for generating said video stream includes a multi-media computer and router controlled by firewall software.

5. An apparatus as claimed in claim 1, wherein said means for generating said video stream comprises a multi-media computer having a video capture card, network card, firewall software, a presentation monitor, and means by which personnel at the child care center or school may enter personalized or current information on the child's activities.

6. An apparatus as claimed in claim 1, further comprising a pre-recorded library of videos and a video server for supplying said videos to subscribers and to said child care facility on demand.

7. An apparatus as claimed in claim 1, wherein said subscriber client node provides a connection to an employer's local area network protected by its own firewall.

8. An apparatus as claimed in claim 7, wherein said employer's local area network for splitting video feeds supplied through said client node into multiple video feeds that can be distributed to subscriber computers connected to the employer's local area network.

9. An apparatus as claimed in claim 1, wherein said supply of live video feeds from said regional broadcast server to said subscriber client nodes is by means of an Internet Service Provider.

10. An apparatus as claimed in claim 1, wherein said means for displaying one of said live video feeds includes web browser software capable of receiving streaming video feeds.

11. An apparatus as claimed in claim 1, wherein a number of cameras in said child care center is greater than one, and each camera generates a live video feed routed via a network and a firewall to said regional broadcast server, said network selected from the group consisting of a local area network and a closed circuit television network.

12. An apparatus as claimed in claim 1, further comprising means for recording a live video feed for delayed broadcast or archiving.

13. A method of increasing access to child care training materials and services, including demonstrations and lectures, by child care service providers and parents, as part of an integrated child care network which also provides for increased parental involvement with child care personnel, including the ability of parents to observe classroom activities in real-time during the workday, comprising the steps of:

generating a live video feed from video captured by a video camera at a location in a child care facility from which video of the children can be captured;

supplying said live video feed to a regional broadcast server remote from said child care center;

splitting said live video feed into multiple video feeds and supplying said multiple video feeds over the Internet to a plurality of client nodes authorized to receive said live video feeds;

displaying said one of said live video feeds on a subscriber computer connected to said one of said client nodes upon authorization to receive said one of said live video feeds; and connecting said subscriber computer and said childcare facility via the Internet to a server arranged to provide child care information to said parents and to personnel at said child care facility on demand, wherein said step of displaying said one of said live video feeds is carried out by using web browser software capable not only of receiving streaming video feeds, but also of enabling said parents to communicate directly over the Internet with personnel at said child care center from any location having Internet access.

14. An apparatus as claimed in claim 13, further comprising the steps of requiring parents to secure a digital certificate that will be provided to a secure electronic transaction server of the network in order to limit access to authorized users only.

15. A method as claimed in claim 13, further comprising the step of supplying on demand videos relating to child care from a pre-recorded video library.

16. A method as claimed in claim 13, further comprising the step of supplying live video feeds from a training facility to said child care center for training purposes.

17. A method as claimed in claim 13, wherein the step of transferring the live video feed to client nodes comprises the step of transferring the live video feed to client nodes as part of a web page.

18. A method as claimed in claim 17, wherein said step of transferring the live video feed further comprises the step of transferring notes related to said live video feed from said child care center for display on said web page.

19. A method as claimed in claim 17, wherein said step of transferring the live video feed further comprises the step of transferring links to sources of child care information.

20. A method as claimed in claim 13, further comprising the step of delivering e-mail messages related to said video feed.

21. A method as claimed in claim 13, wherein one of said client nodes is a firewall connected to an employer's local area network, and further comprising the step of said one of said video feeds supplied to said one of said client nodes into multiple video feeds for distribution over the employer's local area network.

22. A method as claimed in claim 13, further comprising the step of recording said video feeds for delayed broadcast or archiving.

23. A method of limiting access to video broadcasts from a child care center, comprising the steps of:

posting a daily password, which changes each day that video broadcasts are available, in such a manner that the posting is only visible by persons delivering children to the child care center;

limiting access to broadcasts from the child care center to persons whose identity has been verified through the use of digital certificates.

24. A method as claimed in claim 23, wherein the step of limiting access to broadcasts from the child care center comprises the step of requiring that the subscriber present her digital certificate prior to authorizing access to said video broadcast.

* * * * *